United States Patent Office 3,256,270
Patented June 14, 1966

3,256,270
PROCESS FOR THE MANUFACTURE OF
D-FRUCTOSE
Erich Haack, Heidelberg, Franz Braun, Ludwigshafen
(Rhine)-Oppau, and Karlfried Kohler, Mannheim-
Waldhof, Germany, assignors to C. F. Boehringer &
Soehne G.m.b.H., Mannheim-Waldhof, Germany, a
corporation of Germany
No Drawing. Filed Nov. 5, 1962, Ser. No. 235,548
Claims priority, application Germany, Nov. 11, 1961,
B 64,747
9 Claims. (Cl. 260—209)

This invention relates to the preparation of D-fructose and is particularly concerned with isomerizing D-glucose by the action thereon of an aluminate to produce the D-fructose.

The isomerization of D-glucose, D-mannose, and D-fructose by the action of aqueous alkali has long been known. This isomerization reaction is conventionally referred to as the "Lobry de Bruyn-van Ekenstein Conversion" after its discoverers (Rec. trav. chim. Pays-Bas 14, 203/1895 and 15, 92/1896). This reaction has been thoroughly investigated over the years by many researchers and it has been found that D-glucose can be isomerized using as catalyst sodium hydroxide, sodium carbonate, calcium hydroxide, alkaline earth carbonates, alkaline ion exchangers, ammonia and pyridine. However, the amounts of D-fructose thereby formed amount to at the maximum 20–30% (the yields of actually isolated fructose are still lower as the isolation of the fructose from the reaction mixture can be performed only with great difficulty and with considerable loses. For further information regarding the foregoing, attention is directed to the following: Gottfried and Benjamin, Ind. Eng. Chem. 44, 141 (1952); Speck in "Advances in Carbohydrate Chemistry," No. 13, pp. 63–103 (1958); Graefe, "Süsswaren," No. 20, vol. 2, p. 1178 (1958).

Recently it has been proposed to increase the yields of D-fructose obtained by the alkaline isomerization of D-glucose by working in the presence of borates (Mendicino, J. Am. Chem. Soc. 82, 4975/1960). Aside from the fact that the yields recited in the publication are not reproducible (experimental studies carried out by the inventors herein show that a maximum of 50% fructose is formed by the borate method), this process cannot be used industrially for the production of D-fructose, since the amounts of borate, soda lye and solvents present in the reaction mixture with respect to the glucose are so great (3 mols borate, 17 mols NaOH, and 90 liters of water per mol of glucose) that the isolation of the fructose from the reaction mixture is practically impossible.

In short, it is apparent that the process discovered by Lobry de Bruyn and W. A. van Ekenstein has not been able to be exploited industrially for the manufacture of fructose in spite of intensive research along this line over the past 50 years (Klages, "Lehrbuch der Org. Chemie," vol. III, p. 260, 1958; cf. also Ullman's Enzyklopädie der technischen Chemie, 3rd edition, vol. 9, p. 661, 1957).

It is, therefore, an object of this invention to provide a new and improved method for manufacturing D-fructose. It is another object of the invention to provide a method whereby D-glucose can be isomerized to form D-fructose by the treatment of the former with an aluminate.

Another object of this invention is to facilitate the commercial production of D-fructose from D-glucose.

Other objects will be apparent from the description and claims which follow.

These and other objects are attained by means of this invention wherein it was found that D-fructose could be readily prepared in excellent yields if the isomerization of D-glucose by the action of aqueous alkali is carried out using for the isomerization an alkali metal aluminate and in particular sodium aluminate or potassium aluminate. In accordance with the invention approximately 70% of the glucose is converted to fructose. By appropriate processing about 45–60% can be isolated in pure form, while the remaining syrup can be saved for processing along with a further batch.

In accordance with the invention, crude starting materials are also suitable for use in the process. It is thereby made possible for the first time to achieve an industrial production of D-fructose from D-glucose.

The process of the invention is carried out using about 5–30% aqueous glucose solutions and preferably 10–20% aqueous glucose solutions. As has been indicated in place of the pure D-glucose, solutions of crude starch hydrolyzate or saccharose hydrolyzate (invert sugar) can be used for producing the D-fructose. In the case of the saccharose hydrolyzate, the D-fructose formed by the isomerization increases the D-fructose already present in the hydrolyzate from about 50% to about 80% (with reference to saccharose).

The isomerization reaction proceeds readily at temperatures of from 20 to 80° C., temperatures within the range of from 25 to 35° C. being the most preferable. The reaction time at 25 to 35° C. varies from 56 to 14 hours where glucose and starch hydrolyzate starting materials are employed and from 30 to 8 hours in the case of invert sugar.

The aluminate solution required for the conversion is prepared by dissolving aluminum or technical aluminum hydroxide (gibbsite, bayerite) in caustic soda or caustic potash solution. However, the technical sodium aluminate solutions commercially available are also suitable producing substantially the same results. Generally speaking the molar ratio of the luminum to the D-glucose is from 0.5 to 1.0 mol of aluminum per mol of D-glucose (or 190 g. invert sugar) and preferably 0.75 mol of aluminum per mol of D-glucose. The ratio of aluminum to sodium hydroxide or potassium hydroxide in the aluminate solution is from 1:1.5 to 1:2 and preferably 1:1.9 (which corresponds approximately to technical sodium aluminate solution).

When the isomerization is completed, the aluminum is precipitated in the form of its hydroxide and is removed by suction filtering or, alternatively by means of acid ion exchangers. The D-fructose can then be isolated in the known manner as calcium fructosates. The D-fructose is liberated from the fructosate with the carbonic acid and following removal of the water by distillation, is recrystallized out of methanol.

The following examples are given in order to more clearly disclose the nature of the present invention. It should be understood, however, that the examples are not intended to be a limitation on the scope of the invention.

EXAMPLE 1

Preparation of D-fructose from pure D-glucose (a) Sodium aluminate made from aluminum and soda lye

1. PREPARATION OF THE SODIUM ALUMINATE SOLUTION 11.24 grams of aluminum powder are dissolved in 71.0 cc. of 11 N soda lye and 100 cc. water. The slight residue which forms is removed from the aluminuate solution thus obtained by suction filtration.

2. ISOMERIZATION

The sodium aluminate solution is added to a solution of 100 g. pure D-glucose in about 300 cc. water. Water is added to bring the volume up to 1000 cc. and the solution is maintained at 30° C. under thermostatic control for 27.5 hours. The reaction solution at that time contains about 67 g. D-fructose and about 10 g. glucose (colorimetrically determined).

3. PRECIPITATION OF THE ALUMINUM HYDROXIDE 96 cc. 12.1 N hydrochloric acid are added with agitation to the reaction solution at a temperature of 30–40° C. The clear solution formed having a pH of 3.8 is diluted with water to 2 liters and a suspension of 22 g. calcium carbonate in about 60 cc. water is added slowly and evenly at about 40° C. and under intense stirring. The aluminum hydroxide is thereby precipitated, the resulting mixture is stirred for a further 30 minutes and suction filtered until the filtrate recovered amounts to about 1700 cc. The filter cake is stirred with 300 cc. water for 30 minutes and subjected to suction filtering until about 350 cc. of filtrate are obtained. About 7 grams of fructose remain in the aluminum hydroxide filter cake.

4. PRECIPITATION OF THE FRUCTOSE AS CALCIUM FRUCTOSATE

The combined filtrates (about 2050 cc. of a yellowish solution having a pH 6.5) are chilled to 0° C. Thereafter, a suspension of 28 grams of technical calcium hydroxide in 50 cc. water is added under stirring, the stirring being continued for an additional 20 minutes. An additional 28 grams of calcium hydroxide in 50 cc. water is thereupon slowly added and the agitation continued for another 30 minutes at 0° C. The calcium fructosate precipitate which is formed is suction filtered at 0° C. using a refrigerated filter, and the resulting filter cake immediately taken up in 200 cc. lime water. The suspension formed is subjected to suction filtering. The two filtrates which have been recovered still contain about 6 grams and .5 gram respectively of D-fructose.

5. DECOMPOSITION OF THE CALCIUM FRUCTOSATE WITH CARBON DIOXIDE

The filter cake obtained as above set out is immediately transferred into 300 cc. of ice-cold water contained in a vessel made of V4A under stirring. The resulting suspension is exposed under continuous agitation and ice-cooling to carbon dioxide under pressure, until a pressure of about 2 atmospheres of overpressure remains constant. The absorption of carbon dioxide is completed in a few minutes. After the pressure is relieved, the calcium carbonate precipitate is allowed to stand for 30 minutes at 20° C. and thereafter it is subjected to suction filtering. The calcium carbonate recovered is washed twice with 50 cc. water on the Büchner filter.

6. EVAPORATION OF THE FRUCTOSE SOLUTION AND PREPARATION OF CRYSTALLIZED FRUCTOSE

The colorless fructose solution (approx. 700 cc. containing about 53 g. D-fructose) is evaporated at 40° C. bath temperature and a pressure of 12 torr, to about 200 cc. The calcium carbonate formed from the dissolved calcium carbonate during the evaporation is removed by suction filtering and the remaining filtrate completely dried at 40° C. The highly viscous, colorless syrup obtained (57.19 grams) is dissolved in 70 cc. of hot absolute methanol, cooled, inoculated with D-fructose and permitted to stand in a refrigerator with occasional stirring. After about 20 hours, the crystallized D-fructose is recovered by suction filtering, washed with 10 cc. ice-cold absolute methanol, and dried in a vacuum dessicator over phosphorus pentoxide. There are thereby recovered 38.80 grams of colorless D-fructose (1st crystallizate): $[\alpha]_D^{20} = -91.6°$ (c.=2 in water). By concentrating the mother liquor under vacuum, an additional 6.43 grams of colorless D-fructose is obtained; $[\alpha]_D^{20} = -90.0°$ (c.=2 in water). After complete removal of the methanol by vacuum distillation and drying of the residue in a vacuum desiccator over phosphorus pentoxide, 10.7 grams of a slightly yellowish syrup are finally obtained (residual syrup; $[\alpha]_D^{20} = -68.8°$ (c.=2 in water). According to colorimetric analysis, this residual syrup still contains 7.2 grams D-fructose and about 0.3 gram of D-glucose. It can be reserved for further processing together with a new batch so that the D-fructose it contains will also be recovered in crystalline form.

(b) *Technical sodium aluminate solution*

In place of the sodium aluminate solution described in Example 1a, a technical sodium aluminate solution of commercial grade is used. The sodium aluminate solution contains 125 g. $Al_2O_3$, 184 g. NaOH and 15.9 g. $Na_2CO_3$ per liter, plus various impurities.

170 cc. of the aluminate solution (corresponding to 11.24 g. Al and 71 cc. 11 N NaOH) are reacted with 100 g. D-glucose as described above and processed in the same manner (105 cc. of 12.1 N hydrochloric acid are, however, required for the acidification of the alkaline reaction solution instead of the 96 cc. of 12.1 N HCl in Example 1a.) A yield of 54.5 g. of crude syrup is obtained. Crystallization from methanol produces:

|  | G. |
|---|---|
| D-fructose (1st crystallizate) | 37.97 |
| D-fructose (2nd crystallizate) | 7.54 |
|  | 45.51 | and 6.24 g. residual syrup.

(c) *Sodium aluminate prepared from technical gibbsite*

38.6 g. technical gibbsite (corresponding to 21.22 g. $Al_2O_3$ or 11.24 g. Al) are dissolved in 71 cc. 11 N soda lye by briefly heating the mixture to about 100° C. 100 g. D-glucose are then reacted with this solution as described at *a* above. Following the processing of the solution as above described, 55.42 g. of crude syrup are obtained.

Crystallization from methanol produces:

|  | G. |
|---|---|
| D-fructose (1st crystallizate) | 39.97 |
| D-fructose (2nd crystallizate) | 5.33 |
|  | 45.30 | plus 6.24 g. residual syrup.

(d) *Potassium aluminate prepared from aluminum and potash lye*

11.24 g. aluminum powder are dissolved in 71.0 cc. 11 N potash lye and 100 cc. of water. The aluminate solution thus obtained in suction filtered to remove the slight solid residue contained therein. 100 grams of D-glucose are reacted with this solution as has been described under *a* above. After following the processing procedure, therein set out, 55.3 grams of crude syrup are obtained. Crystallization from methanol produces:

|  | G. |
|---|---|
| D-fructose (1st crystallizate) | 36.11 |
| D-fructose (2nd crystallizate) | 6.45 |
|  | 42.56 | and 10.36 g. residual syrup containing 7.4 grams of D-fructose.

EXAMPLE 2

*Preparation of D-fructose from industrial flour*

750 grams of industrial flour (starch content 80–84%), 2550 cc. water and 24.2 cc. 12.1 N hydrochloric acid are heated with agitation on an oil bath in a vessel made of V4A, within 1 hour to a temperature of 130° C. Agitation is continued for 15 minutes at this temperature. Thereafter the mixture is cooled to room temperature and the unhydrolyzed fibers and other impurities removed by suction filtering. In this manner, 3060 cc. of a brown glucose solution are obtained.

The hydrolyzate derived from 111 g. industrial flour is treated with sodium aluminate substantially as described in example 1a and is processed as specified in the same example. 47.6 grams (43.0% with reference to the flour) of a crude syrup are thus obtained. Crystallization from methanol produces:

30.03 g. (27.0% with ref. to the flour) D-fructose (1st crystallizate), $[\alpha]_D^{20}=-91.6°$
5.56 g. (5.0% with ref. to the flour) D-fructose (2nd crystallizate), $[\alpha]_D^{20}=-91.9°$ 35.59 g. (32.0% with ref. to the flour)

and 9.03 g. (8.1% with ref. to the flour) of a residual syrup, $[\alpha]_D^{20}=-66.5°$.

On colorimetric analysis, the residual syrup is found to still contain 6.55 g. (5.9% with ref. to the flour) of D-fructose.

EXAMPLE 3

*Preparation of D-fructose from cornstarch*

750 g. cornstarch (starch content about 86%), 2550 cc. water and 12.0 cc. 12.1 N hydrochloric acid are heated for one hour with agitation on an oil bath in a vessel made of V4A to a temperature of 130° C. Agitation is continued for 40 minutes at this temperature. The mixture is thereafter cooled to room temperature. In this manner, 3045 cc. of a brownish glucose solution are obtained.

The hydrolyzate corresponding to 124 g. cornstarch is treated with sodium aluminate as has been described in Example 1a and then further processed in the same manner. 53.86 g. (43.3% with reference to the starch) of a crude syrup are obtained. Crystallization out of methanol produces:

40.24 g. (32.5% with ref. to starch) of D-fructose (1st crystallizate)
4.49 g. (3.6% with ref. to starch) of D-fructose (2nd crystallizate)

44.73 g. (36.1% with ref. to starch)

and 6.99 g. (5.64% with ref. to starch) of residual syrup containing an additional 5.1 grams of D-fructose.

EXAMPLE 4

*Production of D-fructose from sucrose*

100 g. sucrose are dissolved in 300 cc. of water and the solution is heated to 85° C. 0.6 cc. of 12.1 N hydrochloric acid is added, and the mixture is permitted to stand for 1 hour at 85° C. The invert sugar solution thus obtained is cooled to room temperature.

(a)

The aforesaid invert sugar solution is treated with sodium aluminate solution as described in Example 1a for 15 hours at 30 degrees C. to produce a solution containing 79 g. fructose and about 20 g. glucose. This solution is further processed as set out above producing 65.9 g. of a crude syrup. Crystallization from methanol produces:

| | G. |
|---|---|
| D-fructose (1st crystallizate), $[\alpha]_D^{20}=-92.6°$ | 43.34 |
| D-fructose (2nd crystallizate), $[\alpha]_D^{20}=-90.8°$ | 9.27 |
| | 52.61 | and 9.71 g. of a residual syrup, $[\alpha]_D^{20}=-68.5°$.

(b)

*Removal of the aluminum with ion exchangers*

The invert sugar solution recovered according to a of the instant example is adjusted to a pH of 4 using 95 cc. of 12.1 N hydrochloric acid therefor and is then passed through a column 40 cm. high containing 1.8 liters of ion exchange resin Amberlite IR–120 (H-form). Following a washing out of the column with 1000 water, the resulting acid solution is adjusted with 100 cc. 11 N soda lye to a pH of 6.5 and processed as described in Example 1a4–6. In this manner, 71.3 g. of a crude syrup are obtained. Crystallization from methanol produces:

| | G. |
|---|---|
| D-fructose (1st crystallizate), $[\alpha]_{20}^{19}=-92.1°$ | 50.82 |
| D-fructose (2nd crystallizate), $[\alpha]_D^{19}=-92.0°$ | 5.87 |
| | 56.69 | and 10.75 g. of a residual syrup containing 7.7 g. D-fructose.

EXAMPLE 5

The isomerization of 100 g. of pure D-glucose is carried out as described in Example 1a. A mixture of 64.5 cc. 12.1 N hydrochloric acid and 35.5 cc. of 12.5 N sulfuric acid is added with agitation to the reaction solution in order to precipitate the aluminum hydroxide (temperature 30–40° C.). Thereafter at about 40° C. a suspension of 12 g. calcium carbonate in about 20 cc. water is slowly added with intense agitation. The resulting suspension is stirred for another 5 minutes. The precipitate is recovered using a suction filter at about 40° C., and immediately washed on a Buechner filter 3 times, using 50 cc. of water each time. In this manner the aluminum hydroxide is obtained in a form lending itself to easy separation with a suction filter and so that no fructose at all is left in the precipitate. The commercial advantages resulting therefrom are believed readily apparent.

To precipitate the fructose, the filtrate (1090 cc.) is chilled at 0° C. and 25 g. of calcium hydroxide are added two separate times in a manner similar to that described in Example 1a. After similar processing, 61.97 g. of crude syrup are obtained. Crystallization from methanol produces:

| | G. |
|---|---|
| D-fructose (1st crystallizate) | 54.97 |
| D-fructose (2nd crystallizate) | 4.30 |
| | 59.27 | and 2.60 g. residual syrup.

We claim:
1. In the method of preparing D-fructose by the isomerization of D-glucose by the action of aqueous alkali thereon, the improvement which comprises subjecting D-glucose to the action of an alkali metal aluminate at a temperature of from 20–80° C., wherein said alkali metal aluminate is employed in an amount whereby the molar ratio of aluminum to glucose is in the range of 0.5 to 1 mol of aluminum to 1 mol of glucose and the ratio of aluminum to alkali metal hydroxide in the alkali metal aluminate is from 1:1.5 to 1:2.

2. Improvement according to claim 1 wherein said isomerization is effected at a temperature within the range of from 25–35° C.

3. Improvement according to claim 1 wherein the ratio of aluminum to alkali metal hydroxide and the alkali metal aluminate is 1:1.9.

4. Improvement according to claim 1 wherein said alkali metal aluminate is a member selected from the group consisting of potassium aluminate and sodium aluminate.

5. Improvement according to claim 1 wherein said alkali metal aluminate is employed in an amount whereby the molar ratio of aluminum to glucose is 0.75 to 1.

6. Improvement according to claim 1 wherein the D-glucose is present in the form of an aqueous solution thereof having a concentration of D-glucose of about 5 to 30%.

7. Improvement according to claim 1 wherein the glucose is present in the form of an aqueous solution thereof having a concentration of D-glucose of about 10 to 20%.

8. Improvement according to claim 1 wherein the D-glucose is present in a crude starch hydrolyzate.

9. Improvement according to claim 1 wherein the D-glucose is present in a saccharose hydrolyzate.

References Cited by the Examiner

UNITED STATES PATENTS 1,401,433  12/1921  Olivarius _____ 260—209 X

OTHER REFERENCES

Sidgwick, Chemical Elements and Their Compounds, vol. I, 1950, page 420.

Mendicino, J. R., "Effect of Borate on the Alkali-Catalyzed Isomerization of Sugars," Jour. Am. Chem. Soc., vol. 82, Sept. 20, 1960, pages 4975–4979.

LEWIS GOTTS, *Primary Examiner.*

CHARLES B. PARKER, *Examiner.*

NORMA S. MILESTONE, J. R. GENTRY, JOHNNIE R. BROWN, *Assistant Examiners.*